(12) United States Patent
Cedervall et al.

(10) Patent No.: US 6,671,514 B1
(45) Date of Patent: Dec. 30, 2003

(54) SYSTEM AND METHOD FOR LOCATION POSITIONING A MOBILE STATION IN A CDMA CELLULAR SYSTEM

(75) Inventors: Mats Cedervall, Täby (SE); Jonas Karlsson, Yokohama (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/488,817

(22) Filed: Jan. 20, 2000

Related U.S. Application Data (63) Continuation-in-part of application No. 08/951,345, filed on Oct. 16, 1997, now Pat. No. 6,157,842.

(51) Int. Cl.$^7$ .................................................. H04Q 7/20
(52) U.S. Cl. ..................... 455/456.1; 342/480
(58) Field of Search ................. 455/456, 457, 455/456.1; 342/450, 458, 463

(56) References Cited

U.S. PATENT DOCUMENTS

| 5,293,645 A | | 3/1994 | Sood ........................... 455/54.1 |
| 5,600,706 A | * | 2/1997 | Dunn et al. .................. 342/450 |
| 5,768,380 A | * | 6/1998 | Rosauer et al. ............. 370/252 |
| 6,021,330 A | * | 2/2000 | Vannucci ..................... 342/457 |

FOREIGN PATENT DOCUMENTS

| WO | WO 99/11086 | 3/1999 |
| WO | WO 99/21388 | 4/1999 |

* cited by examiner

*Primary Examiner*—Nay Maung
*Assistant Examiner*—Tu X Nguyen (57) ABSTRACT

A system and method for improving the accuracy of a location estimation measurement within a telecommunication system is disclosed. Transmissions from surrounding base transceiver systems are received by a reference location device and any inter-base transceiver system timing differences resolved. A location estimate of the mobile station within the telecommunications system is then obtained.

51 Claims, 3 Drawing Sheets

SYSTEM AND METHOD FOR LOCATION POSITIONING A MOBILE STATION IN A CDMA CELLULAR SYSTEM

PRIORITY STATEMENT UNDER 35 U.S.C. §119 & 37 C.F.R. §1.78

This nonprovisional application claims priority based upon the following prior U.S. Patent Application and is a Continuation-In-Part thereof: Ser. No. 08/951,345, filed Oct. 16, 1997 titled System and Method For Positioning a Mobile Station in a CDMA Cellular System invented by Karlsson et al. now U.S. Pat. No. 6,157,842.

BACKGROUND OF THE PRESENT INVENTION

1. Field of the Invention

The present invention relates, in general, to wireless communications systems, particularly, to a system and method for improved mobile station location, and, more particularly, to a system and method for facilitating the location positioning of a mobile station in a code division multiple access cellular system.

2. Background and Objects of the Present Invention

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

Pursuant to a recent Federal Communications Commission (FCC) Ruling and Order, cellular phone service providers within the United States must provide by October 2001 the capability to locate the position of a cellular or mobile phone making an emergency (911) call within the provider's system to within 125 meters with about 67% probability, i.e., within one standard statistical deviation. A variety of techniques are currently under study to implement geolocation technology into existing and proposed systems.

Of course, one simple way to get a rough indication of a mobile terminal or station's (MS) position is to determine the identity of the current cell. A more accurate, but still approximate, mechanism is based upon handovers (including soft handovers), by which the propagation time between the MS and an associated base transceiver station (BTS) is measured. The handover method is simple to implement since it involves very little change in the radio part. Further, the various BTSs in such a system do not need an absolute time reference. The handover technique is generally considered unsatisfactory, however, since a handover to two other geographically located BTSs (needed for trilateration) is rare, particularly if the telecommunications system employs 1-cell frequency reuse, as is understood in the art.

An antenna array solution has been proposed by which an MS' geolocation may be calculated from an estimated direction and the roundtrip delay of the communication signals. Naturally, the inclusion of a Global Positioning System (GPS) device within the MS would solve the geolocation problem, at a cost, however, of excessive computational and receiver complexity in the MS.

Another proposed solution to the above problem is set forth in Applicant's co-pending and commonly owned patent application entitled "System and Method for Positioning a Mobile Station in a CDMA Cellular System", U.S. Ser. No. 08/951,345, filed Oct. 16, 1997, of which the instant invention is a Continuation-in-a-Part, and which is incorporated herein by reference. In the co-pending application, a modified downlink measurement solution is proposed in which signals by the BTSs and MSs are repeatedly idled in order to improve the reception (or "hearability") of more remote systems, thereby enabling the exchange of timing information and trilateration therefrom.

For Code Division Multiple Access (CDMA) systems, the downlink measurements are made by the MS on signals transmitted by the BTSs, e.g., within the pilot channel data. These methods, however, require an absolute time reference in (or synchronization of) the BTSs. The downlink method of the aforementioned Continuation-in-Part application obtains the requisite timing references through signal cessations.

Other proposed solutions include uplink measurements made by the BTSs based upon MS signals, e.g., a long, known training sequence. Such methods, however, as with the downlink techniques, require an absolute time reference in the respective BTS(s) or that inter-BTS timing is known. A combined uplink/downlink solution by Applicants' Assignee, which overcomes the timing/synchronization requirement, is set forth in U.S. patent application Ser. No. 08/935,421, entitled "Method and System for Determining Position of Cellular Mobile Terminal", filed Sep. 23, 1997, which is also incorporated herein by reference. The combined solution set forth in said application involves the utilization of uplink and downlink signal propagation airtimes to determine the distance between a mobile station and a base station, thereby avoiding the requirement of the absolute time reference or synchronization.

Finally, power measurement geolocation techniques have been employed which estimate signal path loss and, therefore, distance. Such techniques, however, are not very accurate.

Of the above solutions, only the downlink, uplink and combined downlink/uplink techniques are remotely feasible, but each has fundamental problems. The stand-alone downlink solution, for example, has the inherent problem of hearing a sufficient number of BTSs. This is the so-called "near-far" problem, which is particularly serious in CDMA systems. The combined technique also has some drawbacks in that the positioning may take a considerable time since both downlink and uplink measurements are required. Also, reliability in the combined technique is poorer since hearability is limited to that link (up or down) having the worst performance. Finally, more information bandwidth is required in the combined technique.

With regard to the stand-alone uplink technique, it, too, has some difficulties. For example, the near-far problem in such systems may be combated by increasing the transmitter power of the MS and by transmitting a known signal for a long period of time, all of which has serious effects upon system performance. Transmitting a known sequence requires either overriding speech on the speech channel, potentially causing speech disruption, or sending the pattern in parallel, resulting in increased MS complexity, battery drainage and increased information bandwidth usage. The aforementioned problems worsen if the signal is transmitted over a longer period of time.

As discussed, the above uplink and downlink technique require the known relative timing between the BTSs. Although this problem is immediately solvable by inclusion of a GPS receiver in each BTS, this costly alternative is not feasible for small base station systems (BSS), particularly micro and pico BSSs. Furthermore, reliance upon an independent system means the operator has no control over system performance.

A still further problem, related particularly to a current Wideband CDMA standard (WCDMA), is that although the MS can find the primary and secondary synchronization codes from neighboring BTSs, the particular identities of those transmitting BTSs are unknown, which would mean that any timing information obtained is useless. It is, however, possible to ascertain the correct BTS for each signal by detecting the Broadcast Control Channels (BCCH) of the respective BTSs. This, however, requires that the signal to noise (S/I) ratio be fairly high so as to better capture signals from the more remote BTSs.

By way of background, the basics of a Time Division Multiple Access system and a CDMA system will now be discussed to better illustrate some of the aforementioned problems in geolocation in these two systems, as also set forth in Applicant's co-pending parent application. For example, in Time Division Multiple Access (TDMA) telecommunications systems a mobile terminal or station (MS) is in communication with a given base transceiver station or system (BTS) during only one of typically eight sequential and repeating timeslots. Other MSs communicate separately with the BTS during the other timeslots. The MS may therefore utilize one or more of the other, unused (by that mobile station) timeslots for other uses, such as positioning. In this manner, the timeslot and frame structure of TDMA protocols may be exploited.

Figure 1:
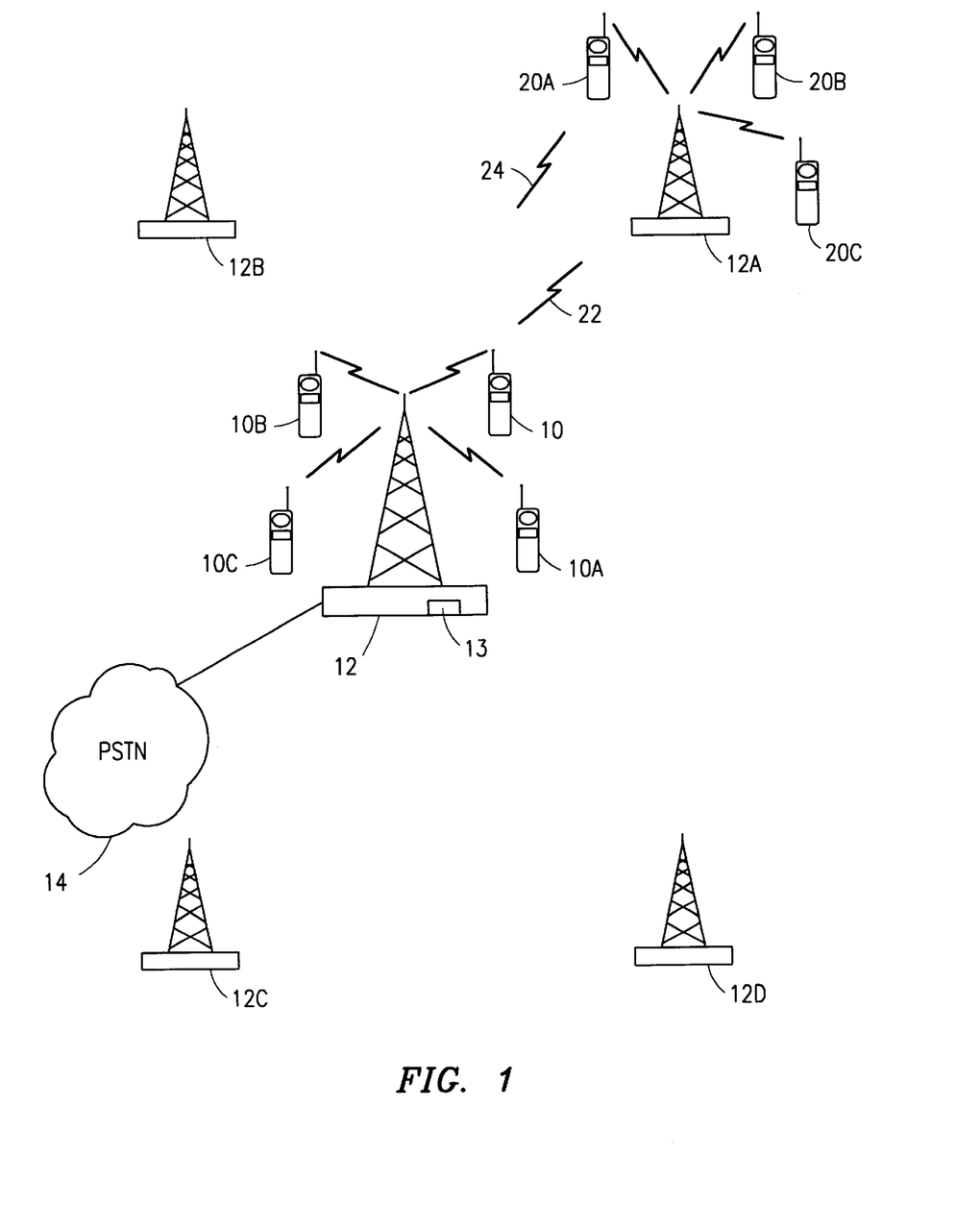
FIG. 1 is a block diagram illustrating base transceiver systems and mobile stations, which constitute components of a telecommunications system employing the principles of the present invention.

With reference to FIG. 1, there is shown a portion of a cellular telecommunications system having a mobile station 10 in communication with a first BTS 12 and, of course, in communication with another user linked thereto, such as via a Public Switched Telephone Network (PSTN) 14. Additional mobile stations 10A, 10B and 10C, also in communication with the BTS 12, are also shown.

As is understood in the telecommunications art, the MS 10 monitors the strength of its signal link with the BTS 12 and maintains that link until a better signal link occurs, e.g., the MS 10 may move away from the BTS 12 toward a neighboring BTS, such as one of BTSs 12A–12D, and hand over control to that BTS. To accomplish such handovers, the MS 10 also monitors the signal strengths of the neighboring BTSs 12A–12D (and any other such systems within range). TDMA systems utilize frequency reuse algorithms to distribute sets of discrete frequencies in a non-repeating manner so that contiguous communications areas or cells, covered by respective BTSs, do not share frequencies. In this way, the MS 10 in TDMA systems may readily measure the received power from a given BTS on unused timeslots and using frequencies different from that of a neighboring BTS.

Code Division Multiple Access (CDMA) systems, on the other hand, operate very differently from the aforementioned TDMA systems and provide fewer and less advantageous opportunities to exploit the inherent properties of the standard. CDMA protocols do not achieve their multiple access property by a division of the transmissions of different users in either time or frequency, as in TDMA and in Frequency Division Multiple Access systems, but instead make a division by assigning each user a different code, which is used to transform a user's signal into a wideband or spread-spectrum signal which is joined with other such signals from other users. As is understood in the art, a receiver receiving multiple wideband signals uses the code assigned to a particular user to transform the wideband signal received from that user within the combined signal back to the original signal. Additionally, and with reference again to FIG. 1, each BTS in a CDMA system uses the same frequencies, thereby further limiting the exploitation of distinguishing features.

Accordingly, under CDMA protocols, particularly the current IS-95 standard, it is a non-trivial task to modify the standard to accomplish the FCC mandate. One particular problem encountered is estimating an MS' position when the MS is relatively close to a given BTS, e.g., MS 10 and BTS 12 in FIG. 1. In operation, the determination of an MS' position entails using either several base stations, e.g., BTSs 12 and 12A–12D, measuring the time delay of at least three of their signals to the MS 10, or the MS 10 itself measures the time delays to several of the BTSs. As shown in FIG. 1, if the MS 10 is close to BTS 12 and the neighboring BTSs 12A–12D are doing the positioning measurements, e.g., through signal time delay, then the signal from the MS 10 may be too weak for the much more distant base stations, i.e., BTS 12C, to measure. Conversely, if the MS 10 in this situation were doing the measurements, then the strong transmission power from the adjacent BTS 12 may drown out the signals, on the same frequencies, from all of the more distant BTSs 12A–12D.

There is, therefore, a need to provide an improved system and method for determining the geographical position of a mobile station within a CDMA environment.

It is, accordingly, a first object of the present invention to provide such an improved system and method for mobile station location positioning.

It is also an object of the invention that the system and method of the present invention substantially adhere to CDMA protocols, for example, the IS-95 standard, and the Universal Mobile Telephone System (UMTS) proposal for Wideband CDMA (WCDMA).

It is a further object of the invention that the system and method set forth herein allow telecommunications systems operating in CDMA (and WCDMA) to meet the upcoming FCC requirements for mobile station positioning within the United States and any subsequent countries requiring such geolocation positional accuracy.

It is a still further object of the present invention that the system and method facilitate mobile station positioning in a variety of contexts, including situations where the mobile station is adjacent one base transceiver system and distant from contiguous or neighboring base transceiver systems.

SUMMARY OF THE INVENTION

The present invention is directed to a system and method for improving the accuracy of a location estimation measurement of a mobile station within a telecommunications system. Transmissions from surrounding base transceiver systems are received by a reference location device and any inter-base transceiver system timing differences resolved. A location estimate of the mobile station within the telecommunications system is then obtained.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The EIA/TIA/IS-95 "Mobile Station-Base Station Compatibility Standard for Dual-Mode Wideband Spread Spectrum Cellular System" defines a digital cellular radio common air interface using Code Division Multiple Access (CDMA) technology. Pursuant to CDMA standards, both the base transceiver station, e.g., BTSs 12 and 12A–12D in FIG. 1, and the mobile station 10 transmit a Pseudo-random Noise (PN) spreading sequence, resulting in a 1.23 MHZ transmission bandwidth.

The forward or downlink transmission from each BTS to a mobile station or terminal has four types of channels: pilot, paging, synchronization (sync) and traffic. As is understood in the art, these channels are all transmitted on the same carrier frequency, using the same PN spreading code. The channels, however, are distinguished through binary orthogonal codes, e.g., Walsh functions. Each BTS transmits one pilot channel, one sync channel and multiple paging and traffic channels. The downlink signals from different BTSs are distinguished through PN spreading code phase offsets, i.e., every BTS uses the same PN spreading code, but the code is transmitted using different time offsets (or code phases) from a master code.

On the reverse or uplink CDMA transmission, e.g., from the mobile station (MS) 10 to the BTS 12, each mobile transmission is differentiated within the BTS 12 by the use of a long PN spreading code, where each MS transmits at a code phase time offset determined by a user address. It should be understood, however, that prior to being assigned such an uplink, the MS 10 must contact the BTS 12 using a reverse or uplink access channel.

With reference again to FIG. 1, position calculation of a mobile station such as MS 10 within a geographic area may be performed through the use of time difference of arrival trilateration techniques, such as hyperbolic trilateration, time of arrival techniques, such as ranging trilateration, and angle of arrival techniques. In a preferred embodiment of the present invention, using time differences of arrival (TDOA) techniques, the intersection of three or more hyperbolic curves of constant time delay of pulse arrival between three BTSs and an MS (in certain circumstances two BTSs may suffice to pinpoint the geographical location of the MS). It should be understood, however, that the intersection of at least two hyperbolae normally suffices.

Figure 2:
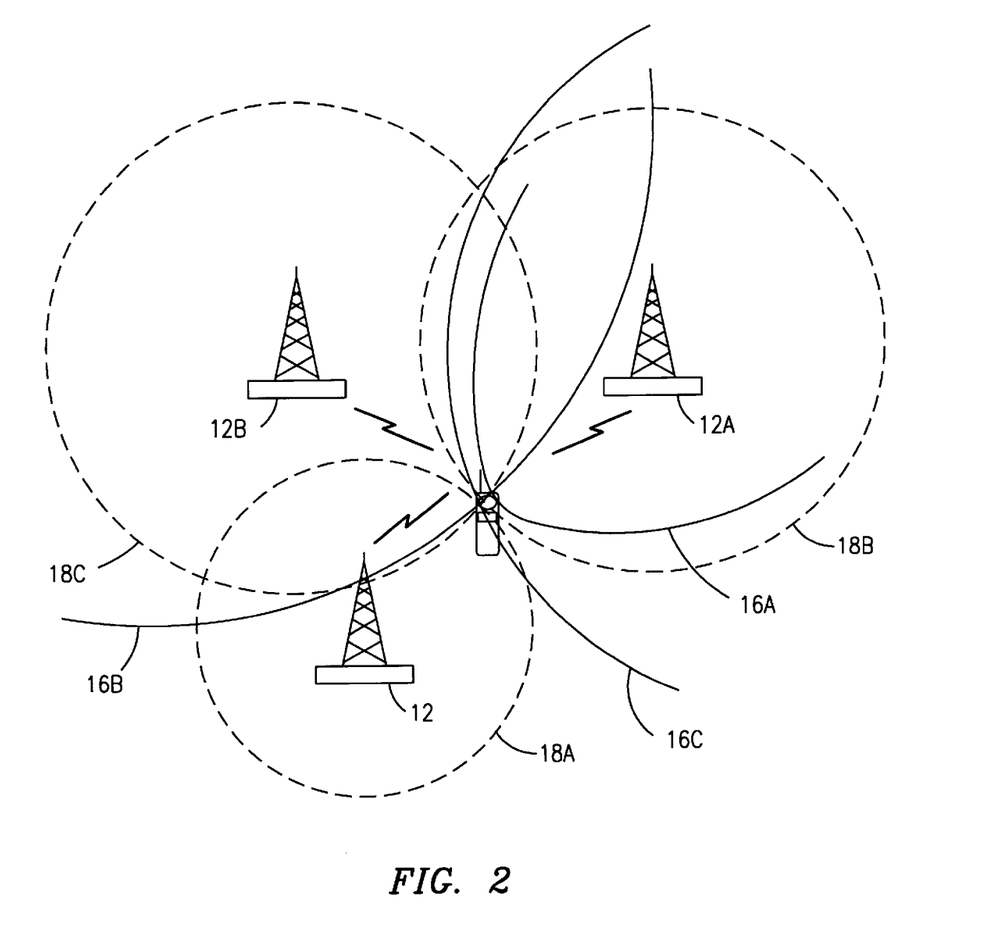
FIG. 2 is a representative diagram of various time delay techniques used in position location estimation of mobile stations, such as utilized in implementing the present invention with the configuration shown in FIG. 1.

With reference now to FIG. 2, there is shown a portion of FIG. 1 in which the MS 10 is in communication with the BTS 12. Neighboring BTSs 12A and 12B are also shown. In measuring the aforementioned TDOA between an MS 10 and two BTSs, e.g., of the signal from the MS 10, a hyperbola is formed, as is understood in the mathematical arts. For example, hyperbola 16A represents the line of potential locations of the MS 10 with reference to both BTSs 12 and 12A so that the difference in distance (time) between the two BTSs at each point along the hyperbola 16A is a constant. Similarly, hyperbola 16B is formed between BTSs 12 and 12B, and hyperbola 16C is formed between BTSs 12A and 12B.

As shown in FIG. 2, in the idealized absence of measurement error all three hyperbolae, i.e., hyperbolae 16A, 16B and 16C, intersect at the location of the MS 10. It should be understood, however, that in the real-world presence of measurement error, there will be some error in the determination of the intersection point. Inclusion of additional hyperbolae increase the accuracy.

With further reference to FIG. 2, dashed circles 18A, 18B and 18C represent time of arrival (TOA) distances from the respective BTSs 12, 12A and 12B, each representing the absolute propagation time between the respective BTSs and the MS 10. As with the aforementioned hyperbolae, the three circles also intersect at the locus of the MS 10, illustrating another mobile station location estimation technique.

It should, therefore, be understood that in this trilateration manner, i.e., either TDOA, TOA or other, the position of the MS 10 may be ascertained with sufficient accuracy to meet the FCC mandate.

As discussed, however, although TDMA systems and protocols are amenable to adjustments to accommodate the above location estimation techniques, CDMA systems and protocols are difficult to adapt to meet this upcoming requirement. The invention set forth in Applicant's parent application nonetheless attempts to provide a solution to the aforementioned problems facing location estimation techniques in CDMA systems and proposed WCDMA systems.

With reference again to FIG. 1, a first embodiment of the present invention will be described. As discussed, one problem in location estimation in CDMA systems occurs when the MS 10 approaches a given BTS, e.g., BTS 12, too closely. Since a position location technique or algorithm, e.g., resident within a memory 13 in the BTS 12, relies upon the receipt of timing information from a minimum of three BTSs (in some instances two may suffice), when the MS 10 gets sufficiently close to BTS 12, it is by necessity furthest form the other neighboring BTSs. As a result, the signal to interference (S/I) ratios of signal links between the MS 10 and distant range BTSs, e.g., BTSs 12A and 12B, become degraded. In other words, as the MS 10 closely approaches BTS 12, the signals from that BTS saturate the MS 10 receiver, preventing reception of signals from the BTSs 12A and 12B (and others).

One solution to this saturation problem is to turn off the BTS 12 for a short period of time, on the order of milliseconds or fractions thereof, introducing an idle period in the downlink during which the MS 10 can receive signals, such as a pilot signal on the pilot channel, from the more distant BTSs 12A and 12B and any other nearby BTSs. In this way, the advantages of the silent periods in TDMA systems may be incorporated in this different signal environment.

It should, of course, be understood that such cessations or shutdowns should be minimized to avoid frequent disruptions to the other mobile stations, i.e., MSs 10A–10C, also in communication with the BTS 12. As is understood in the art, the synchronization signal incorporates numerous information about the respective BTS, including a BTS identifier for that BTS, time reference information used in the aforementioned time delay techniques, and other information. The pilot channel, used for homing, usually consists of a sequence of zeros.

It should be understood that during the aforementioned idle period inserted into the CDMA transmission stream, the TDOA, TOA or other distance estimation measurements may be calculated and combined in the aforementioned manner to pinpoint the geographical location of the MS 10 to the desired FCC degree of accuracy. It should also be understood that the three BTSs used in the location estimation may be those shown in FIG. 2, i.e., BTSs 12, 12A and 12B, where the timing delay information for the temporarily idle BTS 12 is calculated just prior to or after the idle period. Alternatively, if, for some reason, all of the measurements have to be carried out simultaneously, three neighboring BTSs, e.g., BTSs 12A, 12B and 12C, may instead be used to calculate the position of the MS 10 during the quiescent period of the BTS 12.

There are various mechanisms by which the BTS 12 may introduce the aforementioned idle period within the downlink CDMA wideband transmission signal. First, the pertinent BTS may steal the requisite idle period of a given time interval of duration from normal transmission, and rely on conventional masking techniques to correct the information gap. Second, as with the exploitation of TDMA protocols, the air interface standard of the CDMA or other like protocol may be exploited to provide the requisite idle time periods.

Since the simultaneous powering down of two or more neighboring BTSs, e.g., BTS 12 and 12A, could render the measurements done during the idle period worthless, the idle periods should be generated in a given BTS pursuant to a random or pseudo-random technique to avoid periodic simultaneous BTS shutdowns. It should, of course, be understood that a requisite pseudo-random repetition of the idle periods at a given BTS may be determined by a unique BTS value associated with each BTS.

In an alternate embodiment of the present invention, the aforementioned idle periods are distributed in a non-random, periodical manner, presenting a more simple air interface design decision. As discussed, the advantage of employing random idle periods is that a given MS would less likely encounter simultaneous idle periods of the BTSs used in location measurements. This periodicity may, nevertheless, be achieved using periodical idle periods if an MS about its BTS, e.g., MS 10, reports each such instance of simultaneous (or nearly simultaneous) conflicting idle periods to the serving BTS, i.e., BTS 12. Upon detection of the (near) simultaneous signals, the BTS 12 may then transmit a time signal 22 to the pertinent BTS involved, e.g., BTS 12A, for adjusting the periodicity of the idle periods for the pertinent BTS to no longer coincide with that of BTS 12. Alternatively, the BTS 12 may adjust its own idle period timing to avoid conflict with the other BTS 12A. It should be understood that this timing or periodicity adjustment could also constitute a relocation of the idle period within the CDMA frame structure or a time shift of the entire frame structure, as is understood in the art.

Since the MS 10 must ascertain that an idle period has occurred to perform the aforedescribed pilot signal measurements, the BTS 12 may pretransmit an idle period signal to herald an imminent idle period. Alternatively, the MS 10 can use the aforementioned unique BTS value to calculate the time of occurrence of the idle period for a respective BTS. Further, the MS 10 can identify the occurrence of an idle period and thereafter determine the pseudo-random occurrence of subsequent idle periods according to a given periodicity or pattern pursuant to an algorithm for such occurrences. It should be understood, however, that the MS 10, after performing the aforementioned distance measurements, e.g., time delay estimation or power measurements, transmits the measured distance values from the neighboring BTSS, upon resumption of communications with the BTS 12, to the BTS 12, which includes a memory and procedure for storing and performing the actual positioning calculations.

It should be understood that all downlink transmissions to the MSs need not be turned off in the BTS 12, as they are in the first embodiment of the present invention. Instead, in a second alternate embodiment of the present invention, all transmissions from the BTS 12 are ceased during the aforementioned idle period except the pilot signal from the BTS 12. As is understood in the art, particularly under the IS-95 standard, the aforementioned pilot signal is used by the MS 10 to find a BTS. The synchronization or sync channel is then employed by the MS 10 to ascertain which BTS was found.

One mechanism the MS 10 may employ to determine the identity of a found BTS is to have the MS 10 transmit the found PN-sequence offset for that BTS, each BTS having its own PN-sequence offset, the pilot channel alone identifying the BTS (after the pertinent information is served up to the BTS 12 which makes this determination). It should be understood, however, that although the present embodiments are directed towards the current IS-95 CDMA standard, future CDMA standards may employ additional and other broadcast channels that could be used to identify the found BTS. Accordingly, the scope of the present invention should not be limited to usage with the current standard alone. It should also be understood that in this second alternate embodiment of the present invention the idle periods need not be generated pseudo-randomly if the MS 10 uses pilot signals for measuring.

In the uplink scenario, i.e., transmission from the MS 10 to the BTS 12, the aforedescribed idle period of transmissions by the BTS 12 may be used by the BTS 12 to perform time delay or other measurements on distant MSs, e.g., one of MSs 20A, 20B and 20C in communication with the adjacent BTS 12A. In this third alternate embodiment of the present invention, the position estimation of the distant MS 20A by BTS 12 is performed by silencing all or at least most of the mobile stations, e.g., MSs 10, 10A, 10B and 10C about BTS 12 and focusing the trilateration or other techniques on the distant MS 20A using the BTSs 12, 12A and 12B, for example, and any other neighboring BTSs. As discussed, MS 20A, operating on the same frequencies as the MSs 10 and 10A–10C, is also in communication with BTS 12 (and other nearby BTSs) via a signal 24, which may reach the BTS 12 and other trilateration BTSs, such as BTS 12B, when the local traffic has been quieted, i.e., during an idle period.

In other words, MSs 10, 10A and 10B are silent only during the time of the measurements performed by their local BTS 12 on the remote MS 20A. When, however, BTS 12A is measuring the "remote" MS 10, then only those MSs close to BTS 12A, i.e., local MSs 20A–C, should be silent. Of course the numbers and duration of such transmission cessations should be kept to a minimum to avoid interference with normal transmission traffic.

Conversely and with further reference to FIG. 1, position estimation of the MS 10 may be performed using BTS 12A after silencing the MSs 20A–20C in communication therewith, as described in connection with the techniques shown in FIG. 2.

It should, therefore, be understood that the governing BTS, e.g., BTS 12, must forward time alignment commands to the MSs 10 and 10A–10C within its control in order to synchronize the idle periods between them. One mechanism to accomplish this alignment is to align the CDMA frames of the MSs 10 and 10A–10C, as described hereinbefore.

Since the MSs 10A–10C are subjected to signals from not only the adjacent BTS 12 but all other, neighboring BTSs, such as BTSs 12A–12D, one strategy for time alignment is to allow the respective MSs to act on the commands from the strongest BTS in range. This strategy ensures that a majority of the MSs close to a given BTS will be aligned thereto.

With reference again to the downlink scenario of the first and second alternate embodiments of the present invention, it should be apparent that the BTS 12, during its own idle period, can measure properties from the other BTSs, e.g., BTSs 12A–12D, such as time delays for the position estimation. This idle period measurement by the turned-off BTS is useful in situations where the MS performs some of the time delay measurements since typical positioning solutions require knowledge about the absolute times used by other BTSs. Conventional systems generally transport this information through a network backbone, such as across the PSTN 14 or across a dedicated line. By allowing the BTS, e.g., BTS 12, to do the requisite time measurements on its neighboring BTSs, e.g., BTS 12A and 12B, involved during its own idle period, the MS' position can be readily determined without transporting the absolute time of the neighboring BTSs through the network.

Additionally, by adapting existing systems, particularly signals such as pilot signals, to accomplish the FCC mobile positioning mandate, the present invention avoids the use of dedicated range transceivers and other such additional equipment for such positioning, such as described in U.S. Pat. No. 5,600,706 to Dunn, et al. Such elaborate add-on equipment unnecessarily consumes system resources and operates quite differently from the system and method of the present invention, set forth hereinabove and claimed hereinafter.

It should be understood that the aforementioned idle periods may be introduced not only into existing CDMA standards but may be incorporated into future CDMA standards, which would enable the introduction of idle periods without data loss.

Although the presently preferred embodiment of the present invention utilizes the time intervals of transmission cessation for location positioning of mobile stations, it should be understood that the scope of the invention more broadly encompasses the use of such transmission cessations, inserted by the local base transceiver system and otherwise, for other purposes as well.

Although the aforedescribed techniques are an improvement over the difficulties in the prior art, the parent application, U.S. Ser. No. 08/951,345, filed Oct. 16, 1997, entitled "System and Method for Positioning a Mobile Station in a CDMA Cellular System", of which the instant application is a continuation-in-part, addresses some additional problems present in this ever-evolving technology. For example, the aforementioned requirement of absolute time references in the BTSs or inter-BTS timing is a problem. In this Continuation-in-Part continuing patent application, Applicants have further discovered that this problem (and other problems) may be effectively solved by means of various techniques or embodiments, e.g., employing an idle slot downlink (IS-DL) technique, as set forth in more detail hereinbelow.

Figure 3:
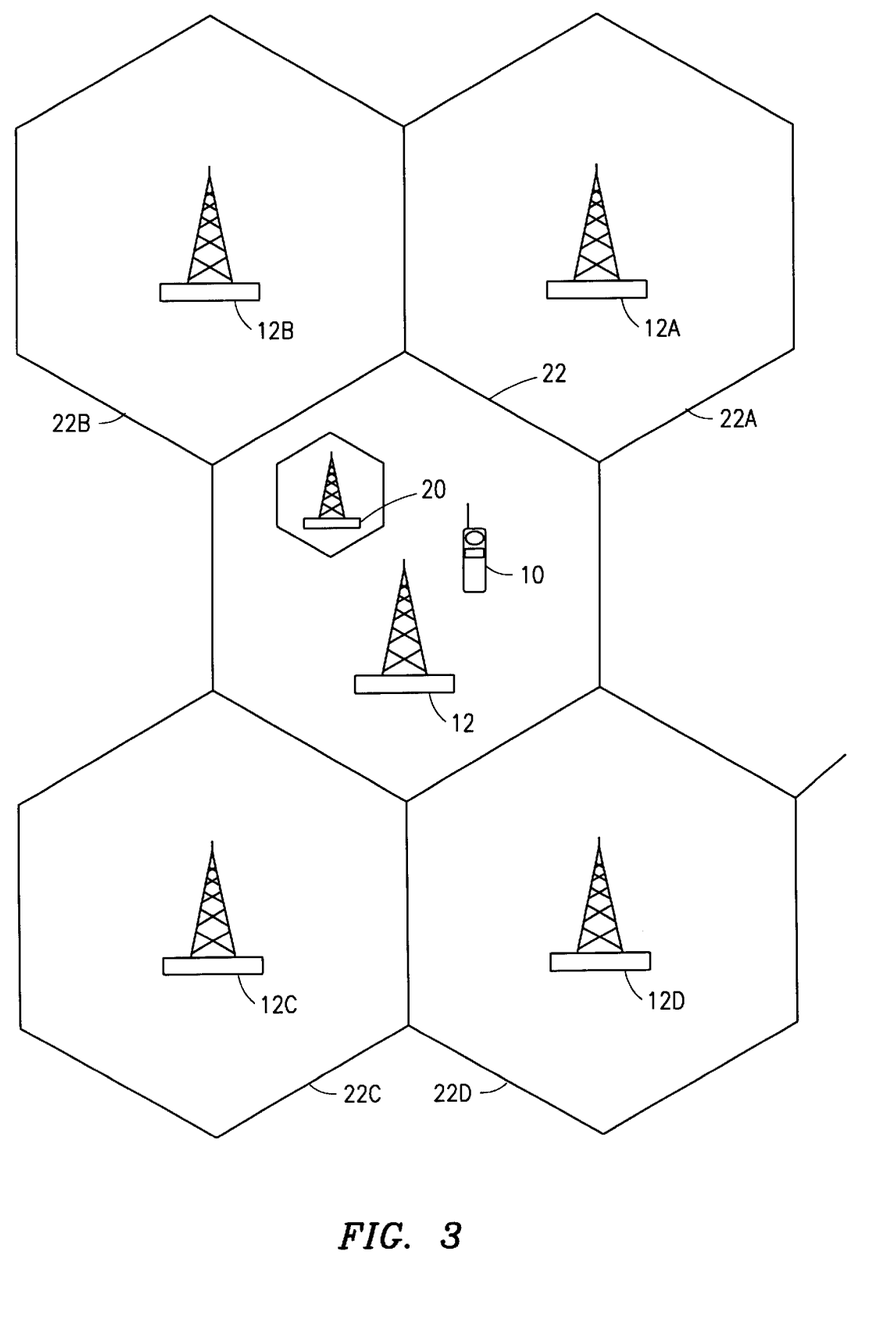
FIG. 3 is a block diagram illustrating the base transceiver systems and mobile stations shown in FIG. 1 within respective cells of the telecommunication system of the present invention.

The requisite timing information is preferably obtained through utilization of reference MSs, which measure the relative timing between different BTSs. This timing is accomplished by taking the propagation time from the BTSs to the reference MS into account. Of course, the actual position of the reference MS must be known, hence its name. In a system without idle slots, e.g., CDMA, the reference MS is preferably located close to the cell boundaries to overcome the aforedescribed near-far problem, i.e., too close proximity to a serving BTS and being too far from surrounding BTSs. This requirement, however, is quite inconvenient since the reference MS must then have sufficient power and preferably a network connection, as well as an elevated position (to reduce the effect of multipath). It should, nonetheless, be understood that the reference MSs may be co-located with the BTSs.

Where the timing information is obtained from a reference MS, e.g., MS 10 in FIG. 1, there is inherent redundancy since only one reference MS is needed to determine the timing between two BTSs, e.g., BTS 12 and BTS 12A or between BTS 12 and another BTS 20 within a cell 22 covered by BTS 12, as illustrated in FIG. 3. It should be understood that BTS 20, covering a subportion 22A of the overlaying cell 22, may be a micro or pico BTS servicing the area within subportion 22A, e.g., a given building or corporate park. In this simpler scenario, if there is sufficient hearability between BTSs 12 and 12A, as well as between BTSs 12 and 20, with the reference MS 10, timing information is readily obtained and geolocation enabled.

With reference again to FIG. 3, serving BTS 12 covering cell 22 is surrounded by BTSs 12A–12B, each of which cover adjacent regions within cells 22A–22D, respectively. As discussed, the BTSs are in contact with each other. For simplicity, denote the serving BTS, i.e., BTS 12, as BTS0 and the neighboring BTSs as BTS1 . . . BTSN, e.g., BTS1 to BTS4 for BTSs 12A–12D, respectively. Denote the time that BTSi transmits its DL frame Ti with the time measured in the time base of the serving BTS, i.e., BTS0. It should be understood that although the particular time base utilized for calculating the position is preferably that of the serving BTS, the time base of another BTS may be employed instead. Denote the timing difference between BTSi and BTSj by $\Delta_{ij}$. In other terms:

$$T_j = T_i + \Delta_{ij} \tag{1}$$

It should be understood that to translate the times reported by the reference MS into a common time base, estimates of the timing differences are required. Accordingly, if time base BTS0 is used as a reference, estimates for $\Delta_{0j}$ (where j=1 . . . N) are needed. It should be understood that some of the j's may not have direct estimates available, but may readily be estimated using simple identity and associative relations, such as:

$$\Delta_{ij} = -\Delta_{ji}; \text{ and} \tag{2}$$

$$\Delta_{ij} = \Delta_{ik} + \Delta_{kj} \tag{3}$$

Even though a direct estimate for $\Delta_{0j}$ may be available, it should be understood that it may be worthwhile to utilize equations (2) and (3) above to improve the estimate. For example, if there are K estimates of $\Delta_{0j}$, obtained either from direct measurements or from measurements in other BTSs with equations (2) and (3), and if measurement i is denoted by $\Delta_i$ and has a known (or estimated) standard deviation $\sigma_i$, then an improved estimate may be obtained from the weighted sum indicated below:

$$\sum_{i=1}^{K} w_i \Delta_i \quad (4)$$

where the various weights satisfy the following constraint:

$$\sum_{i=1}^{K} w_i = 1 \quad (5)$$

The variance of equation (4), assuming independence between the measurements, is determined by:

$$\sum_{i=1}^{K} w_i^2 \sigma_i^2 \quad (6)$$

Minimization of equation (6) with respect to the weights ($w_i$) pursuant to the constraints of equation (5) results in optimal weights, which is a standard quadratic programming problem where the solution is given by:

$$w_i = \frac{\sigma_i^{-2}}{\left(\sum_{k=1}^{K} \sigma_k^{-2}\right)} \quad (7)$$

It should be understood that the aforedescribed improved estimate technique is one way to utilize inherent redundancy. Another technique, which could be more robust in reality, is to employ additional estimates to detect outliers in the timing estimates, i.e, larger-than-normal expected errors.

Turning now to some problems within the WCDMA standard, e.g., as proposed by the Universal Mobile Telephone System (UMTS) protocol, WCDMA employs two codes: a primary synchronization code (PSC) and a secondary synchronization code (SSC), which are used to perform cell searches. For instance, in WCDMA the aforementioned IS-DL positioning method can perform positioning measurements using the PSC and SSC codes. In particular, each BTS, e.g., BTSs 12 and 12A–12D in FIGS. 1 and 3, employ a common 256 chip PSC code which is transmitted once during each slot (where a frame is divided into 16 slots).

The MS 10, as shown in FIGS. 1 and 3, correlates, e.g., with a matched filter therein, the PSC transmissions in range and finds the respective slot timings of the BTSs in the area, e.g., BTS 12 and 12A–12D or a subset thereof. Since, however, the PSC transmissions are the same, the correlation fails to identify the BTS source of a respective PSC transmission.

The SSCs are configured differently and uniquely, enabling MS identification. In particular, the SSCs are constructed by selecting 16 codes in a given order out of a set of seventeen (17) 256-chip codes. From a total of 32 SSC's, a given BTS' code group may be ascertained. The different portions of the SSC are transmitted at the same time as the PSC, i.e., one 256-chip portion at a time. Accordingly, when MS 10 detects the SSC from a particular BTS, the code group of that BTS is detected along with the frame timing.

In typical cell searches, the MS then detects the so-called long code used by the BCCH. In positioning, however, the signal-to-interference level (S/I) may be too low to obtain the long code and the correlation time would be increased. Accordingly, it is desirous to determine the identity of the particular BTS transmitting the signal without accessing the BCCH.

When MS 10 is ordered to position itself, it is already connected to a BTS, i.e., BTS 12 in FIGS. 1 and 3. Accordingly, additional information is available to facilitate the search. It should, of course, be understood that if the MS is in idle, a connection must first be made. Useful information includes, but is not limited to, the approximate timing of the neighboring BTSs, which SSC codes those BTSs are using (or equivalently the code groups of those BTSs), and the position and exact timing of the neighboring BTSs. When the requisite timing information is available, the MS 10 can then search a much smaller time window. Further, the MS may perform the PSC and SSC correlations simultaneously. In an effort to improve the probability of hearing weak BTSs, non-coherent combinations of the correlation results from different idle slots may be utilized. Additionally, when the approximate timing is known, it becomes computationally feasible to use the BCH directly instead of the PSC/SSC.

The position and exact timing of the BTSs described above may be employed by the MS to calculate the position itself, which would be useful in situations that continuously track position, e.g., navigation. The position can be obtained without reverse-link communications.

It should be understood that the total idle period for signal cessation should be at least one slot long in order to assure that all possible PSC/SSC combinations from all BTSs are heard. An entire slot, however, may be covered by dividing the idle slot into several segments. For example, the first half of a slot may be idled in one frame and in the next frame the second half is idled. Every idle period preferably contains a guard period in order to ensure that the entire code can be heard during one of the idle periods. Hence, there is a tradeoff between total guard time used and the length of the idle periods. Shorter idle periods yield a smaller bit error rate (BER) and frame error rate (FER).

Another problem facing mobile positioning techniques, particularly within the evolving UMTS WCDMA standard, is a Time-of-Arrival/BTS (TOA-BTS) pairing problem, which is caused by the limited number of SSCs available. Since in positioning the MS 10 reports a TOA, as illustrated in FIG. 2, of a given SSC, the problem of TOA-BTS pairing is to ascertain which BTS transmitted that particular SSC. It has been found that this problem may be reduced by designing the system and network appropriately. For example, if the system, only a portion of which is shown in the Figures, is planned with many identifying SSCs, it is far easier to ascertain from which BTS a given SSC originated. One preferred solution using spread Hadamard codes is an example of a suitable design having multiple SSCs which do not significantly increase the computational burden of identification. It should be readily apparent that larger frequency reuse distances would also facilitate TOA-BTS pairing. For situations where closely-spaced BTSs use the same SSC, offset planning permits usage at different times, thereby facilitating identification of the originating BTS. A problem with this approach is the need for quasi-synchronized BTSs, i.e., GPSs or stable network connections. Although it is possible to arrange this without synchronization, e.g., two BTSs with similar transmit times shifting timing, this approach also is fraught with problems.

In a network designed and configured to facilitate TOA-BTS pairing, there are various mechanisms to achieve this. As an initial step, likely candidates should be selected and unlikely candidates discarded. This initial selection may be based upon various techniques: estimated power, previous BTSs and timing off. In the estimated power technique, predictions are made on the average received power from each of the candidate BTSs within the MS' cell. Those below a given power threshold are rejected. An advantage of this technique is that the pertinent computations can be made offline and only recomputed when something changes in the network. The remaining BTSs then form an initial candidate list. Similarly, if a BTS has not been involved in a positioning or a SOHO for an MS in the current cell, even after a significant amount of time, the previous BTS technique removes that BTS from the candidate list. Finally, in the timing off technique, using an approximate MS position it is simple to predict the appropriate TOA the MS will report for a given BTS. If the difference between that predicted TOA and the reported TOA for that given BTS is greater than the uncertainty of the MS positions, that given BTS is removed from the candidate list. Where cells are relatively small and BTS timing random, there is a large probability that false BTSs are rejected by this technique. For example, if the time uncertainty corresponding to the position uncertainty is 64 chip intervals, there is a 99.8% probability of false BTS rejection. Where SSC timing is planned, this probability will rise.

In practice, there is a large probability that after applying the above techniques, preferably combinations thereof, only one BTS remains from the candidate list. It should nonetheless be understood that in a small fraction of cases, two (or more) BTSs remain in the candidate list for a given SSC. Assuming for sake of simplicity that there are two remaining BTSs, in the candidate list (although the below methods may be complexed for greater numbers also), presenting two distinct situations. In the first, there is only one TOA reported for the SSC and in the other situation there are two. To put it simply, in the first case, the problem is to determine from which BTS the detected SSC originated, and in the second case, the problem is to match the BTSs with the correct TOA. To make this more refined selection, a long code (LC) detection, computational and/or estimated power technique may be employed.

As discussed, if the MS can detect the LC, i.e., BCCH, of one of the BTSs, the pairing problem is solved. The S/I, however, must be quite high in this instance. In the computational technique, given a cost function, the method chooses the BTS that provides the best curve fit. In the second case described hereinabove, the TOA-BS combination which best fits the cost function is chosen. If the MS position can be calculated without the SSC (and its BTS uncertainty), then that position may be used to eliminate the other possible choice. If, however, BTS timings at the MS position are similar, the computational technique has difficulty selecting the correct BTS since the two "fits" are also similar. It is, therefore, best to leave such ambiguities out of the selection process, although the computational technique will if necessary make a selection. It should be understood that if the timing difference of the two BTSs is very small at the MS position, the position error caused by selecting the wrong BTS is small.

Where the computational technique has resolution difficulties and the MS position cannot be calculated without the assistance of this TOA, the aforementioned estimated power technique may be employed, as described above in connection with the initial selection. That BTS having the best estimated power fit is selected.

The previous description is of preferred embodiments for implementing the invention, and the scope of the invention should not necessarily be limited by this description. The scope of the present invention is instead defined by the following claims.

What is claimed is:

1. A radiocommunication system for determining a geolocation position of a mobile station therein, said radiocommunication system comprising:
   reference timing means for receiving, from at least one neighboring base transceiver system and a serving base transceiver system, a plurality of time-of-arrival signals corresponding thereto, said reference timing means being at a reference location position within said radiocommunication system;
   selection means for selecting at least one likely time-of-arrival-base transceiver system pairing; and
   calculation means for calculating said geolocation position of said mobile station within said radiocommunications system using said reference location position and said at least one likely time-of-arrival-base transceiver system pairing.

2. The radiocommunication system according to claim 1, wherein said radiocommunications system further comprises a code division multiple access cellular telephone system.

3. The radiocommunication system according to claim 2, wherein said radiocommunications system further comprises a wideband code division multiple access cellular telephone system.

4. The radiocommunications system according to claim 1, wherein said reference timing means calculates respective timing differences between said respective transmission timings.

5. The radiocommunications system according to claim 4, wherein said calculation means employs an idle slot downlink link.

6. The radiocommunications system according to claim 1, wherein said at least one neighboring base transceiver system and said serving base transceiver system each introduce respective idle periods on respective downlinks to said mobile station.

7. The radiocommunications system according to claim 6, wherein said respective idle periods of said at least one neighboring base transceiver systems and said serving base transceiver system occur non-simultaneously.

8. The radiocommunications system according to claim 6, wherein at least two of said respective idle periods of any one of said at least one neighboring base transceiver system or said serving base transceiver system occur simultaneously.

9. The radiocommunications system according to claim 8, wherein said mobile station reports the simultaneous occurrence of said at least two idle periods and the identity of the respective simultaneously idling base transceiver systems corresponding thereto to said serving base transceiver system.

10. The radiocommunications system according to claim 9, wherein said serving base transceiver system transmits a time signal to at least one of said simultaneously idling base transceiver systems, said time signal specifying an adjustment time for at least one of said simultaneously idling base transceiver systems to adjust the timing of said idle period.

11. The radiocommunications system according to claim 10, wherein said time signal specifies a relocation of said idle period in the frame structure of said at least one simultaneously idling base transceiver system.

12. The radiocommunications system according to claim 10, wherein said time signal specifies a shift of a frame structure of said at least one simultaneously idling base transceiver system.

13. The radiocommunications system according to claim 6, wherein said mobile station calculates the time of occurrence of a subsequent idle period by a given one of said at least one neighboring base transceiver system or said serving base transceiver system.

14. The radiocommunications system according to claim 13, wherein said mobile station performs position calculations during the occurrence of said subsequent idle period.

15. The radiocommunications system according to claim 14, wherein said position calculations are selected from the group consisting of time difference of arrival, time of arrival, and angle of arrival.

16. The radiocommunications system according to claim 14, wherein said position calculations are made on secondary synchronization codes transmitted from one or more of said at least one neighboring base transceiver systems or said serving base transceiver system.

17. The radiocommunications system according to claim 16 wherein said mobile station determines a given one of said at least one neighboring base transceiver system or said serving base transceiver system from which said secondary synchronization code is transmitted.

18. The radiocommunications system according to claim 14, wherein said mobile station eliminates a given one of said neighboring base transceiver systems from said position calculations.

19. The radiocommunications system according to claim 14, wherein said mobile station transmits said position calculations to said serving base transceiver system.

20. The radiocommunications system according to claim 19, wherein said calculation means for calculating said geolocation position of said mobile station is located within a given one of said at least one neighboring base transceiver system or said serving base transceiver system.

21. The radiocommunications system according to claim 14, wherein said serving base transceiver system transmits said respective transmission timings of at least one of said neighboring base transceiver systems and said serving base transceiver system to said mobile station.

22. The radiocommunications system according to claim 21, wherein said calculation means for calculating said geolocation position of said mobile station is located within said mobile station.

23. The radiocommunications system according to claim 6, wherein said mobile station identifies the occurrence of a first idle period of a given one of said at least one neighboring base transceiver system or said serving base transceiver system, and determines therefrom the expected time of occurrence of a subsequent idle period at said given one base transceiver system.

24. The radiocommunications system according to claim 23, wherein said mobile station performs position calculations during the occurrence of said subsequent idle period.

25. The radiocommunications system according to claim 24, wherein said position calculations are selected from the group consisting of time difference of arrival, time of arrival, and angle of arrival.

26. The radiocommunications system according to claim 24, wherein said position calculations are made on secondary synchronization codes transmitted from one or more of said at least one neighboring base transceiver systems or said serving base transceiver system.

27. The radiocommunications system according to claim 26, wherein said mobile station determines a given one of said at least one neighboring base transceiver system or said serving base transceiver system from which said secondary synchronization code is transmitted.

28. The radiocommunications system according to claim 24, wherein said mobile station eliminates a given one of said neighboring base transceiver systems from said position calculations.

29. The radiocommunications system according to claim 24, wherein said mobile station transmits said position calculations to said serving base transceiver system.

30. The radiocommunications system according to claim 29, wherein said calculation means for calculating said geolocation position of said mobile station is located within a given one of said at least one neighboring base transceiver system or said serving base transceiver system.

31. The radiocommunications system according to claim 24, wherein said serving base transceiver system transmits said respective transmission timings of at least one of said neighboring base transceiver systems and said serving base transceiver system to said mobile station.

32. The radiocommunications system according to claim 31, wherein said calculation means for calculating said geolocation position of said mobile station is located within said mobile station.

33. The radiocommunications system according to claim 6, wherein said idle periods are at least one slot long.

34. The radiocommunications system according to claim 6, wherein said idle periods each comprise a plurality of idle subperiods having an idle sum equivalent to one of said idle periods.

35. A method for determining a geolocation position of a mobile station within a radiocommunications system, said method comprising the steps of:

receiving, by a reference timing device located at a reference location position within said radiocommunications system, from at least one neighboring base transceiver system and a serving base transceiver system, a plurality of time-of-arrival signals corresponding thereto;

measuring, for each said at least one neighboring base transceiver system and said serving base transceiver system, respective transmission timings associated therewith;

selecting at least one likely time-of-arrival-base transceiver system pairing; and calculating, from said respective transmission timings, said reference location position and said at least one likely time-of-arrival-base transceiver system pairing, the geolocation position of said mobile station within said radiocommunications system.

36. The method according to claim 35, further comprising the steps of:

calculating, by a given one of said at least one neighboring base transceiver system or said serving base transceiver system, respective timing differences between said respective transmission timings, said respective timing differences being calculated using said respective transmission timings and said reference location of said reference timing device.

37. The method according to claim 35, further comprising the step of:

idling each of said at least one neighboring base transceiver system and said serving base transceiver system on the respective downlinks to said mobile station.

38. The method according to claim 37, wherein said idling step further comprises:

randomizing said idling of said at least one neighboring base transceiver system and said serving base transceiver system, said randomizing providing non-simultaneous idling of said at least one neighboring base transceiver system and said serving base transceiver system.

39. The method according to claim 37, further comprising:

calculating, by said mobile station, the time of an occurrence of a subsequent idle period by a given one of said at least one neighboring base transceiver system and said serving base transceiver system.

40. The method according to claims 39 further comprising the steps of:

performing, by said mobile station during said subsequent idle period, position calculations on said mobile station.

41. The method according to claim 40, wherein said position calculations are selected from the group consisting of time of arrival, time difference of arrival, and angle of arrival.

42. The method according to claim 40, further comprising the step of:

transmitting, from said serving base transceiver system, said respective timing differences of said at least one neighboring base transceiver system and said serving base transceiver system to said mobile station.

43. The method according to claim 42, wherein said step of calculating said geolocation position is performed within said mobile station.

44. The method according to claim 40, further comprising the step of:

transmitting, from said mobile station, said position calculations to said serving base transceiver system.

45. The method according to claim 44, wherein said step of calculating said geolocation position is performed within a given one of said at least one neighboring base transceiver system or said serving base transceiver system.

46. The method according to claim 39, further comprising:

determining, by said mobile station, the occurrence of a first idle period of a given one of said at least one neighboring base transceiver system and said serving base transceiver system; and calculating, by said mobile station, the expected time of occurrence of a subsequent idle period at said given one base transceiver system.

47. The method according to claim 46, wherein said position calculations are selected from the group consisting of time of arrival, time difference of arrival, and angle of arrival.

48. The method according to claim 46, further comprising the step of:

transmitting, from said serving base transceiver system, said respective timing differences of said at least one neighboring base transceiver system and said serving base transceiver system to said mobile station.

49. The method according to claim 48, wherein said step of calculating said geolocation position is performed within said mobile station.

50. The method according to claim 46, further comprising the step of:

transmitting, from said mobile station, said position calculations to said serving base transceiver system.

51. The method according to claim 50, wherein said step of calculating said geolocation position is performed within a given one of said at least one neighboring base transceiver system or said serving base transceiver system.

* * * * *